(12) United States Patent
Galtarossa et al.

(10) Patent No.: US 7,013,085 B2
(45) Date of Patent: Mar. 14, 2006

(54) METHOD AND APPARATUS FOR DETECTION AND COMPENSATION OF PMD PARAMETERS IN SIGNALS TRANSMITTED OVER OPTICAL FIBER LINKS AND SYSTEM OF COMMUNICATION THEREWITH

(75) Inventors: Andrea Galtarossa, Padua (IT); Raoul Fiorone, Genoa (IT); Luca Palmieri, Padua (IT); Andrea Corti, Cantu (IT)

(73) Assignee: Marconi Communications S.p.A., Genoa (IT)

( * ) Notice: Subject to any disclaimer, the term of this patent is extended or adjusted under 35 U.S.C. 154(b) by 90 days.

(21) Appl. No.: 10/469,807

(22) PCT Filed: Mar. 4, 2002

(86) PCT No.: PCT/IB02/01613

§ 371 (c)(1),
(2), (4) Date: Mar. 31, 2004

(87) PCT Pub. No.: WO02/071662

PCT Pub. Date: Sep. 12, 2002

(65) Prior Publication Data

US 2004/0151416 A1    Aug. 5, 2004

(30) Foreign Application Priority Data

Mar. 2, 2001  (IT)  ............................ MI2001A0443

(51) Int. Cl.
*H04B 10/18* (2006.01)
(52) U.S. Cl. ................. 398/81; 398/147; 398/152; 398/159; 385/11
(58) Field of Classification Search ................ None
See application file for complete search history.

(56) References Cited

U.S. PATENT DOCUMENTS 5,227,623 A * 7/1993 Heffner ..................... 356/364
6,563,590 B1 * 5/2003 Chowdhury et al. ........ 356/484

(Continued)

FOREIGN PATENT DOCUMENTS

EP    0 898 391 A2    2/1999
EP    0 964 237 A1    12/1999
EP    0 965 830 A2    12/1999

*Primary Examiner*—Frank G. Font
*Assistant Examiner*—James P. Hughes
(74) *Attorney, Agent, or Firm*—Kirschstein, et al.

(57) ABSTRACT

A method of detecting polarization mode dispersion (PMD) indicative parameters of an optical fiber link comprising at least one transmission channel in which is transmitted a first wideband optical signal with a bandwidth divided into sub-bands. For each sub-band is produced a second reference optical signal with which to find a third optical signal by superposition. For each of the third signals are calculated first parameters considered indicative of the PMD thereof, and with the first parameters of all the sub-bands are calculated second parameters considered indicative of the PMD of the first wideband signal. The method can be used as part of a PMD compensation method for a transmission system employing the parameters calculated for feedback piloting of a PMD compensator. A detection apparatus comprises a generator for generation of the second reference optical signals, an optical mixer for producing superimposition of the first and second signals, one or more photodetectors for finding the electrical beat signal or the first and second signals, a calculation device for calculating the first parameters, and a processor for processing all the first parameters to find therefrom the second parameters which will then be furthered processed. The detection apparatus can be part of a compensation apparatus comprising the compensator and a calculation stage for calculating the compensation and piloting the compensator. The entirety can be part of an optical fiber communication system.

27 Claims, 2 Drawing Sheets

U.S. PATENT DOCUMENTS

Figure 1:
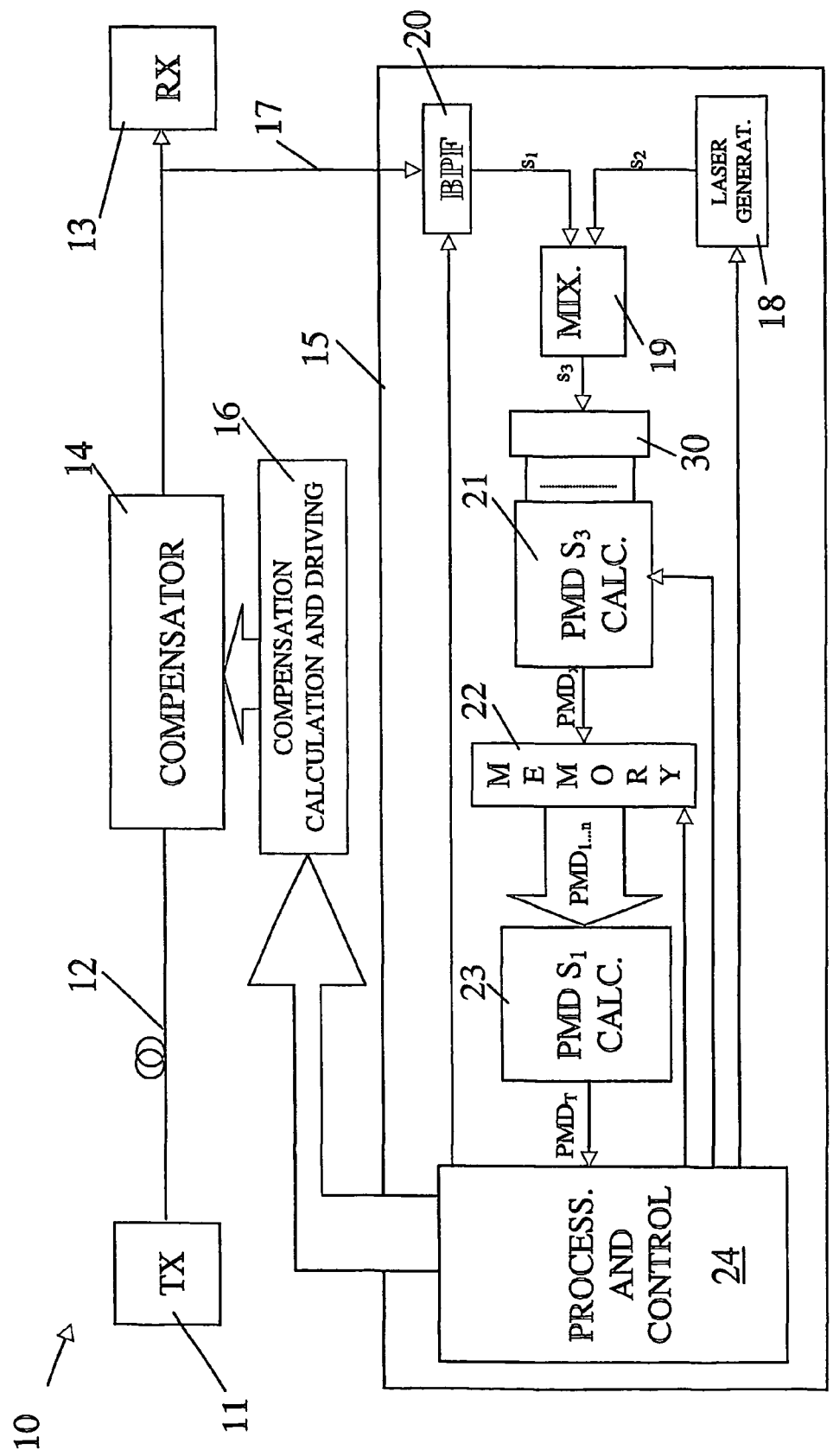

| | | | |
|---|---|---|---|
| 6,697,150 B1 * | 2/2004 | Galtarossa et al. | 356/73.1 |
| 6,724,469 B1 * | 4/2004 | Leblanc | 356/73.1 |
| 6,856,724 B1 * | 2/2005 | Bohn et al. | 385/27 |
| 6,882,771 B1 * | 4/2005 | Islam et al. | 385/24 |
| 2002/0015547 A1 * | 2/2002 | Patel | 385/11 |
| 2004/0161243 A1 * | 8/2004 | Ooi et al. | 398/152 |

* cited by examiner

METHOD AND APPARATUS FOR DETECTION AND COMPENSATION OF PMD PARAMETERS IN SIGNALS TRANSMITTED OVER OPTICAL FIBER LINKS AND SYSTEM OF COMMUNICATION THEREWITH

The present invention relates to methods and apparatuses for detection of and if necessary compensation for Polarization Mode Dispersion (PMD) which occurs when an optical signal travels within an optical fiber based link. The present invention also relates to a communication system using said methods and apparatuses.

It is known that PMD causes distortions and dispersions of optical signals sent over optical fiber links. The combined effect of this is to make the optical signal distorted and dispersed. The different time delays of the various components of the signal in the various polarization states are gaining ever more importance with the increase in transmission speeds. In modern optical fiber based transmission systems at ever higher figure frequencies (10 Gbit/s and more) accurate measurement and compensation of PMD effects become very important.

In the prior art, methods and devices for PMD measurement and compensation have therefore been proposed to improve optical transmission quality. But known systems are not satisfactory. One of the greater disadvantages of known systems is the need to employ dedicated PMD measurement apparatuses operating out of band or on unused fibers. The present invention makes it possible to find PMD data for the optical fiber based link while it is operating. With modern communication systems having very wideband channels (for example, 7 to 20 GHz for 10 Gbit/s communication systems and 30 to 60 GHz for 40 Gbit/s systems) known systems do not give satisfactory results even over the entire band width of a single channel.

The general purpose of the present invention is to remedy the above mentioned shortcomings by making available methods and apparatuses for detection of and if necessary compensation of PMD even with wideband signals and even with several transmission channels.

In view of this purpose it was sought to provide in accordance with the present invention a method for detection of PMD indicative parameters for an optical fiber link comprising at least one transmission channel in which is transmitted a first wideband optical signal with the comprising the steps of dividing the B band in sub-bands, for each sub-band producing an associated second reference optical signal, finding for each second signal a third optical signal originated by the superimposition of said second signal and said first wideband signal or portions thereof, calculating for each of the third signals first parameters considered indicative of the PMD thereof after the beat of the superimposed signals, and processing of the first PMD indicative parameters calculated for all the third signals to find therefrom second parameters considered indicative of the PMD of the first wideband signal.

Again in accordance with the present invention it was sought to provide a PMD compensation method in which PMD data are taken by the above method and second parameters calculated and considered indicative of the wideband signal PMD are employed to feedback control a PMD compensator arranged along the signal path and thus reduce the negative effects caused on the optical signal by the PMD.

In accordance with the present invention it was also sought to provide an apparatus for detection of the PMD indicative parameters of an optical fiber link comprising at least one transmission channel in which is transmitted a first wideband optical signal having a B band and characterized in that it comprises a controllable generator for generation of a plurality of second reference optical signals of different frequencies and possibly with controllable polarization condition, an optical mixer for mixing at least part of the first signal with said second signals to produce for each of said second signals a third optical signal originated by the superimposition of said second signal and the first wideband signal or portions thereof, one or more photodetectors for finding an electrical beat signal or signals taken from the third optical signal, first calculation means for calculating the electrical beat signal or signals of each of the third signals, first parameters considered indicative of the PMD thereof, and second processing means for the first PMD indicative parameters calculated for all the third signals to find therefrom second parameters considered indicative of the PMD of the first wideband signal.

Again in accordance with the present invention it was sought to provide a PMD compensation apparatus in an optical fiber based transmission system comprising at least one transmission channel for a first wideband signal in which the PMD indicative parameters of the wideband signal are detected by the above mentioned method and apparatus and the second parameters calculated and considered indicative of the PMD of said first wideband signal are sent to a PMD compensation unit arranged along the path of the signal with the pilot unit employing said second parameters to feedback control the compensator and reduce the PMD caused signal distortion to less than a predetermined amount.

Lastly in accordance with the present invention it was sought to provide an optical fiber communication system comprising the above mentioned apparatuses and/or applying the above mentioned methods.

Figure 2:
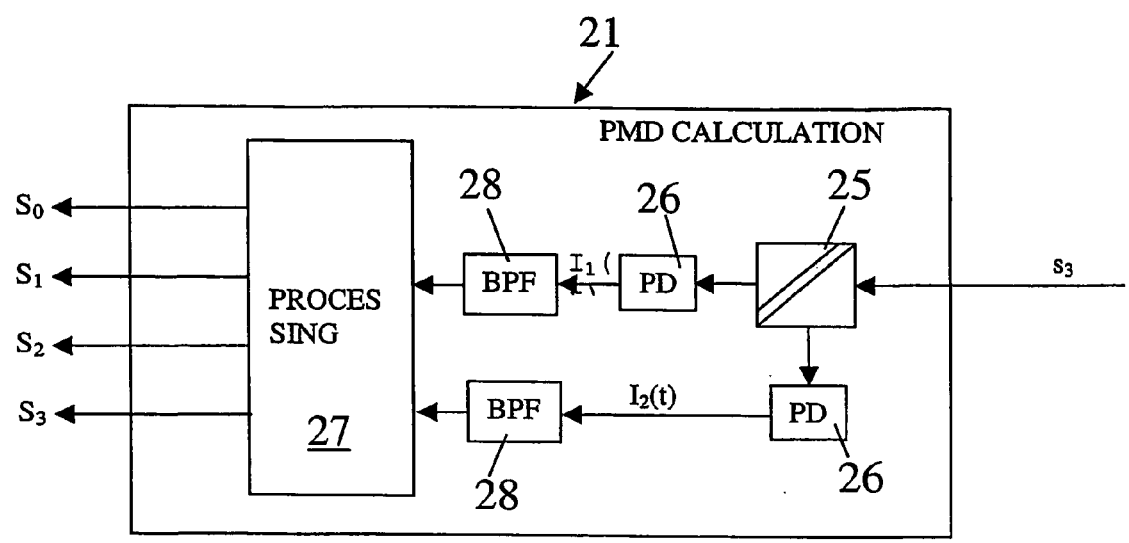

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows a block diagram of a transmission system with an apparatus in accordance with the present invention, and FIG. 2 shows a block diagram of part of the apparatus of FIG. 1.

With reference to the figures, FIG. 1 shows the structure of a communication system provided in accordance with the present invention and designated as a whole by reference number 10. It comprises a transmission system 11 which sends signals to a receiver 13 over an optical fiber based link 12. The transmission system can be one-channel or multi-channel and advantageously of the WDM type and is not further shown nor described in detail as it is readily imaginable to those skilled in the art. Such systems usually operate with a bit rate not lower than 2.5 Gbit/s. The signal bands are correspondingly high (7 to 20 GHz at 10 Gb/s, 30 to 60 GHz at 40 Gb/s). The signal format can be various, for example NRZ, RZ, CRZ, solitary waves and the like.

Along the signal path can be placed a known PMD compensator 14 for example the type comprising birefractive members and polarization conversion devices, i.e. rotators and/or polarization controllers. Before the receiver 13, part of the optical signal is taken to gain PMD data therefrom by means of a detection apparatus 15. As clarified below, the detection apparatus 15 calculates parameters considered indicative of the signal PMD and said parameters can be sent to a compensation calculation and piloting stage 16 which controls the PMD compensator 14 for feedback reduction of the distortions caused by PMD below a determined value. Thus is provided an apparatus 14, 15, 16 indispensable for PMD compensation.

As may be seen in FIG. 1 the apparatus 15 has an input 17 on which it receives part of the transmitted signal. This signal part is drawn off by means of an appropriate known optical coupling device (not shown) arranged on the signal path in such a manner as to not decrease noticeably the power of the signal received from the receiver 13. The apparatus 15 comprises a controllable generator for generation of a plurality of reference optical signals of different frequencies. As clarified below the generator can be made up of a plurality of selectively activated laser sources each tunable if necessary to one or more emission frequencies or if possible even a single frequency source tunable for the entire frequency range involved. The controllable generator can also be controlled from the point of view of the transmitted polarization condition. The optical signal $s_2$ from time to time emitted on command by the generator 18 is sent to a mixer 19 which also receives at input the signal $s_1$ of which it is desired to know the PMD. The mixer performs mixing of the two signals $s_1$ and $s_2$ at input and produces a third optical signal $s_3$ by superimposition.

Advantageously to avoid undesirable effects in the superimposition of two signals input to the mixer the wideband signal input to the apparatus is filtered by a band-pass filter 20 to eliminate any frequency components not involved. The filter 20 can be a fixed filter, a filter tunable on the desired frequencies or a comb filter with appropriately centered frequencies.

The signal $s_3$ is sent to a detector 30 to find the electrical beat signal or signals between $s_1$ and $s_2$ which are then send to block 21 which comprises first calculation means which calculate for each of the third signals $s_3$ applied at input first parameters considered indicative of PMD of the sub-band analyzed. As explained below, the detector 30 is an appropriate photodetector unit.

The conventional B band of the wideband signal at the input 17 is divided in a number n of sub-bands of a width sufficiently small to allow finding accurate information on the parameters representing the PMD. In particular it is advantageous that the number n satisfy the following relationship:

$$\tau_{max} \cdot B/n < \epsilon$$

where $\tau_{max}$ is the maximum Differential Group Delay (DGD) it is desired to detect, $\epsilon$ is a constant expressed in radians with $0<\epsilon<2$ and advantageously $0<\epsilon 0<0.3$.

By division in sub-bands is not meant a B band filtering operation but a conceptual division in frequency intervals. For each sub-band the generator is commanded to produce a signal $s_2$ of appropriate frequency so as to produce an associated signal $s_3$ which is the superimposition of $s_1$ and $s_2$ and can be photodetected and produced by beating one or more electrical frequency signals much smaller than the frequency of the two starting signals $s_1$ and $s_2$.

Advantageously the second signal is chosen with a frequency such as to produce one or more electrical beat signals included in a frequency interval which is basically the same for all the sub-bands. The stages following the mixer can thus always operate in the same stated frequency interval with minimum and maximum frequencies much smaller than the minimum and maximum frequencies of the wideband signal and with a band much smaller than the B band of the wideband signal.

For example, the frequencies generated for the reference signal $s_2$ vary advantageously between $\Omega_2-B/2$ and $\Omega_2+B/2$ with $\Omega_2$ any frequency and advantageously chosen so that $|\Omega_2-\Omega_1|$ is around $B/2$ with $\Omega_1$ being the central frequency of the signal $s_1$.

The PMD indicative parameters calculated for each sub-band (called here PMDx) are memorized in a memory 22. On the basis of the set of parameters $PMD_1$, $PMD_2$, ..., $PMD_n$ calculated for the n sub-bands, second elaboration means 23 find second parameters $PMD_T$ considered indicative of the PMD of the wideband signal at input.

The $PMD_T$ parameters thus found are sent to a processing and control unit 24 which uses the results of the detection for further processing. They can be supplied to the unit 16 for performing PMD compensation.

In the case of transmissions to several channels (for example WDM) the third signals are generated and the first and second parameters are calculated on the wideband signal present in each channel so as to find parameters considered indicative of the PMD of the first wideband signal in each channel. To do this the generator 18 emits reference signals sequentially for each sub-band of each channel and calculation of the PMD indicative parameters is thus performed channel by channel.

Calculation of the characteristic PMD parameters in block 21 for each signal $s_3$ can be done in various known manners. It was found advantageous that said indicative parameters be calculated in the form of known Stokes parameters generally indicated as $S_0$, $S_1$, $S_2$, $S_3$. Calculation of the Stokes parameters is well known to those skilled in the art and not further discussed. Although there are various ways of passing from the optical signal to the corresponding Stokes parameters and these ways are usable in the present invention it was found preferable to use an appropriate optical splitter to divide the third signal $s_3$ into optical components with different polarization states and then send each component to an optoelectrical detector which emits a corresponding electrical signal. The PMD indicative parameters of the third signal are then calculated from the appropriate combination of the electrical signals emitted by the detectors.

FIG. 2 shows an advantageous possible embodiment of stage 21 of FIG. 1. In this advantageous embodiment the signal $s_3$ is sent to an optical splitter 25 which divides the optical signal $s_3$ into two components with separate advantageously nearly orthogonal polarizations. Each component is sent to a corresponding detector or photodiode 26 to have two electrical signals $I_1(t)$ e $I_2(t)$ representing the intensity of the two optical components which are sent to the first calculation means 27 which calculate in a known manner the above mentioned Stokes parameters $S_0$, $S_1$, $S_2$, $S_3$ which make up the PMDx output of block 21 of FIG. 1.

The processing unit 27 can calculate the Stokes parameters by prior art methods readily imaginable to those skilled in the art.

However the PMD indicative parameters of the signal in each sub-band are calculated and represented, the second calculation means 23 perform predetermined operations on the whole of the parameters of the sub-band in which the B band of the original signal is divided so as to find the second PMD indicative parameters of said original signal.

It was found advantageous that the processing of the signals $I_1(t)$ and $I_2(t)$ take place after their filtering with pass-band filters 28 with central frequency dependent on the bit rate and with band width depending on the Differential Group Delay (DGD) of the fiber. In general and as an example, for 10 Gbit/s systems the central frequency can be 7 to 25 GHz while for 40 Gbit/s it can be 30 to 60 GHz.

Finding the second parameters starting from the first parameters can take place in various ways imaginable in themselves to those skilled in the art.

In practice for Stokes parameters, for example the second Stokes parameters $(S_0, S_1, S_2, S_3)_T$ can be found by appropriately processing the n samples thereof which are found from the sub-bands.

Where it is desired to give a DGD figure, for example, it might be decided advantageously to not treat the Stokes parameters directly but calculate the DGD of each sub-band starting therefrom for each sub-band and then use one of the possible strategies such as averaging the DGD of all the sub-bands while taking the average value, the mean value and so forth to find a value for each signal.

Again in accordance with the present invention the second parameters or the PMD data inferable therefrom, can also be advantageously found as average or maximum values of the first parameters or of the PMD data inferable therefrom. The changes in the first parameters as compared to one another i.e. from one sub-band to the other instead of their absolute values can also be advantageously considered significant. The second parameters can therefore be parameters calculated to express these changes. The compensation unit can then be commanded to keep these changes or reduce them to approximately zero. If the first parameters are Stokes parameters this translates in to keeping or bringing back the Stokes parameters to equality among the sub-bands found for each sub-band i.e. flattening the Stokes parameter changes in the sub-band for the entire B band of the signal.

It is now clear that the predetermined purposes have been achieved.

Starting from a stated channel the control unit 24 commands the generator to produce sequentially the signals $S_2$ assigned to all the sub-bands of a channel and commands calculation of the PMD parameters of the associated sub-band for each signal. After scanning of the sub-band the PMD in the specific band is calculated and then the control unit commands the generator to produce the signals $s_2$ associated with the next channel of the transmission system. Once all the channels have been scanned the operation can start over from the beginning. The PMD parameters thus found can then be used to control compensation of the communication system.

With the method and apparatuses in accordance with the present invention it is possible to operate without problems with channels of any band width and for any number of channels and using a single apparatus with the obvious advantages this brings.

It should also be remembered that the method in accordance with the present invention requires no demultiplying of the WDM optical flow and is therefore usable even on line for example in amplification sites or any place access to the fiber can be had economically and not necessarily in reception.

Naturally the above description of an embodiment applying the innovative principles of the present invention is given by way of non-limiting example of said principles within the scope of the exclusive right claimed here.

What is claimed is:

1. A method of detecting polarization mode dispersion (PMD) indicative parameters for an optical fiber link having at least one transmission channel in which is transmitted a first wideband optical signal with a bandwidth, comprising the steps of:

a) dividing the bandwidth into sub-bands;
   b) producing, for each sub-band, an associated second reference optical signal;
   c) obtaining, for each second signal, a third optical signal by superimposing the second signal and at least portions of the first wideband signal;
   d) generating, for each third signal, at least one electrical beat signal, and calculating therefrom first parameters indicative of the PMD thereof; and
   e) processing the first PMD indicative parameters calculated for the at least one beat signal of the sub-bands to find therefrom second parameters indicative of the PMD of the first wideband signal.

2. The method in accordance with claim 1, and choosing the second signal with a frequency to produce the at least one electrical beat signal included in a frequency interval which is substantially the same for all sub-bands.

3. The method in accordance with claim 1, in which the second parameters or PMD data inferable therefrom are found by averaging the first parameters or the PMD data inferable therefrom.

4. The method in accordance with claim 1, in which the second parameters or PMD data inferable therefrom are found by choosing as second parameters maximum values of the first parameters or the PMD data inferable therefrom.

5. The method in accordance with claim 1, in which the first parameters are a differential group delay (DGD) in each sub-band, and in which the second parameters are found by processing the DGDs of the sub-bands.

6. The method in accordance with claim 5, in which the processing of the DGDs comprises calculating an average, mean or maximum value of the DGDs of all the sub-bands.

7. The method in accordance with claim 1, in which the second parameters are representative of changes in the first parameters among the sub-bands.

8. The method in accordance with claim 1, in which there are a plurality of transmission channels, and in which steps a) to e) are performed on the first wideband signal in each channel so as to find parameters indicative of the PMD of the first wideband signal in each channel.

9. The method in accordance with claim 1, in which for calculating the first parameters indicative of the PMD of the third signal, said third signal is divided into optical components with different polarization states, and each optical component is sent to an opto-electrical detector which emits a corresponding electrical signal, the parameters indicative of the PMD of the third signal being calculated from combining electrical signals emitted by the detectors.

10. The method in accordance with claim 9, in which the optical components are two with separate polarizations nearly orthogonal.

11. The method in accordance with claim 1, in which the parameters are Stokes parameters.

12. The method in accordance with claim 8, in which the first wideband signal is a wavelength division multiplexed (WDM) signal, and in which an associated carrier is defined for each channel.

13. The method in accordance with claim 12, in which the WDM signal is filtered with a pass-band centered on the channel carrier for each channel before superimposition on the second reference signal.

14. The method in accordance with claim 12, in which the WDM signals are filtered with a comb filter with frequencies centered on the channel carriers before superimposition on the second reference signal.

15. The method in accordance with claim 1, in which the bandwidth is divided into n sub-bands with n selected to satisfy a relationship:

$$\pi_{max} \cdot B/n < \epsilon$$

where
$\pi_{max}$ is a highest digital group delay to be detected; and
$\epsilon$ is a constant expressed in radians with $0 < \epsilon < 2$ and advantageously $0 < \epsilon < 0.3$.

16. A polarization mode dispersion (PMD) compensation method in a communication system transmitting over optical fibers having at least one channel for transmission of a first wideband optical signal with a bandwidth in which are found PMD indicative parameters of the first wideband optical signal, comprising the steps of:
   a) dividing the bandwidth into sub-bands;
   b) producing, for each sub-band, an associated second reference optical signal;
   c) obtaining, for each second signal, a third optical signal by superimposing the second signal and at least portions of the first wideband signal;
   d) generating, for each third signal, at least one electrical beat signal, and calculating therefrom first parameters indicative of the PMD thereof;
   e) processing the first PMD indicative parameters calculated for the at least one beat signal of the sub-bands to find therefrom second parameters indicative of the PMD of the first wideband signal;
   f) calculating the second parameters considered PMD indicative for the first wideband optical signal, and using the calculated second parameters for feedback controlling a PMD compensator arranged along a signal path; and
   g) reducing distortion of the PMD signal below a preset value.

17. The method in accordance with claim 16, in which the first parameters found for each sub-band are Stokes parameters, and in which the second parameters are parameters indicating changes in the Stokes parameters among the sub-bands with the compensator being controlled for flattening of said changes.

18. An apparatus for detecting polarization mode dispersion (PMD) indicative parameters of an optical fiber link having at least one transmission channel in which is transmitted a first wideband optical signal with a bandwidth divided into sub-bands, the apparatus comprising:
   a) a controllable generator for generating a plurality of second reference optical signals of different frequencies and with a controllable polarization state;
   b) an optical mixer for mixing at least part of the first signal with the second signals to produce, for each of the second signals, a third optical signal originated by superimposition of the second signal on at least portions of the first signal;
   c) a detector for receiving the third signal and taking therefrom a beat signal between the first and second signals;
   d) calculation means for calculating, from the beat signal of each of the third signals, first parameters indicative of the PMD thereof; and
   e) processing means for the first PMD indicative parameters calculated for all the third signals to find therefrom second parameters indicative of the PMD of the first signal.

19. The apparatus in accordance with claim 18, in which the second signal is chosen with a frequency to produce the third signal capable of originating by beating at least one electrical signal included in a frequency interval virtually the same for all the sub-bands.

20. The apparatus in accordance with claim 18, in which there are a plurality of the channels, in which the third signals are generated, and in which the first and second parameters are calculated on the first signal present in each channel so as to find the parameters indicative of the PMD of the first signal in each channel.

21. The apparatus in accordance with claim 18, in which the third signal is applied to a splitter to be divided into optical components with different polarization states, and in which each optical component is sent to an opto-electrical detector which emits a corresponding electrical signal sent to the calculation means for calculation of the parameters indicative of the PMD of the third signal.

22. The apparatus in accordance with claim 21, in which there are two of the optical components with separate and nearly orthogonal polarizations.

23. The apparatus in accordance with claim 18, in which the PMD indicative parameters are Stokes parameters.

24. The apparatus in accordance with claim 20, in which the first signal is a wavelength division multiplexed (WDM) signal, and in which an associated carrier is defined for each channel.

25. The apparatus in accordance with claim 20, in which before the optical mixer, there is a pass-band filter centered on the carrier of a channel of which the PMD is to be calculated.

26. The apparatus in accordance with claim 20, in which before the optical mixer, there is a comb filter with selection of the frequencies on which to perform the detection.

27. An apparatus for polarization mode dispersion (PMD) compensation in a communication system transmitting over optical fibers having at least one transmission channel for a first wideband signal having a bandwidth divided into sub-bands, in which are detected PMD indicative parameters of the first wideband signal, the apparatus comprising:
   a) a controllable generator for generating a plurality of second reference optical signals of different frequencies and with a controllable polarization state;
   b) an optical mixer for mixing at least part of the first signal with the second signals to produce, for each of the second signals, a third optical signal originated by superimposition of the second signal on at least portions of the first signal;
   c) a detector for receiving the third signal and taking therefrom a beat signal between the first and second signals;
   d) calculation means for calculating, from the beat signal of each of the third signals, first parameters indicative of the PMD thereof;
   e) processing means for the first PMD indicative parameters calculated for all the third signals to find therefrom second parameters indicative of the PMD of the first signal; and
   f) a PMD compensator pilot unit arranged along a signal path, the second parameters calculated and PMD indicative of the first wideband signal being sent to the PMD compensator pilot unit, the pilot unit employing the second parameters to feedback control the compensator and reduce, below a predetermined value, distortion of the signal caused by the PMD.

* * * * *

UNITED STATES PATENT AND TRADEMARK OFFICE
CERTIFICATE OF CORRECTION

PATENT NO. : 7,013,085 B2  Page 1 of 1
APPLICATION NO. : 10/469807
DATED : March 14, 2006
INVENTOR(S) : Galtarossa et al.

It is certified that error appears in the above-identified patent and that said Letters Patent is hereby corrected as shown below:

In Column 7, Line 5, in Claim 15, delete "$\pi_{max} \cdot B/n < \varepsilon$" and insert -- $\tau_{max} \cdot B/n < \varepsilon$ --, therefor.

In Column 7, Line 7, in Claim 15, delete "$\pi_{max}$" and insert -- $\tau_{max}$ --, therefor.

Signed and Sealed this

Fifteenth Day of December, 2009

David J. Kappos
*Director of the United States Patent and Trademark Office*